(12) United States Patent
Shimizu

(10) Patent No.: US 11,438,830 B2
(45) Date of Patent: Sep. 6, 2022

(54) TASK EXECUTION SYSTEM, RADIO CONNECTION METHOD, AND PROGRAM

(71) Applicant: TOYOTA JIDOSHA KABUSHIKI KAISHA, Toyota (JP)

(72) Inventor: Susumu Shimizu, Mitaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 17/136,156

(22) Filed: Dec. 29, 2020

(65) Prior Publication Data

US 2021/0250847 A1 Aug. 12, 2021

(30) Foreign Application Priority Data

Feb. 12, 2020 (JP) .............................. JP2020-021784

(51) Int. Cl.
*H04W 36/34* (2009.01)
*H04W 48/16* (2009.01)
*H04W 4/40* (2018.01)

(52) U.S. Cl.
CPC ............. *H04W 48/16* (2013.01); *H04W 4/40* (2018.02); *H04W 36/34* (2013.01)

(58) Field of Classification Search
CPC ......... H04W 48/16; H04W 4/40; H04W 4/44; H04W 4/70; H04W 48/20; H04W 36/0055; H04W 36/32
See application file for complete search history.

(56) References Cited

U.S. PATENT DOCUMENTS

| 2008/0086236 | A1* | 4/2008 | Saito | ...................... G06N 3/008 700/245 |
| 2015/0197010 | A1* | 7/2015 | Ruuspakka | .......... G05D 1/0005 700/245 |

FOREIGN PATENT DOCUMENTS

JP 2008-090576 A 4/2008

* cited by examiner

*Primary Examiner* — Marcus Hammonds
(74) *Attorney, Agent, or Firm* — Oliff PLC

(57) ABSTRACT

A task execution system, a radio connection method, and a program capable of switching a base station which is a connection destination at an appropriate timing are provided. In a task execution system including an autonomous mobile robot configured to sequentially execute a plurality of tasks including movement, the autonomous mobile robot includes a radio communication unit that communicates with a base station, and a connection control unit that searches for the base station with execution of a predetermined task as a trigger and switches base station which is a connection destination of communication by the radio communication unit.

8 Claims, 8 Drawing Sheets

TASK EXECUTION SYSTEM, RADIO CONNECTION METHOD, AND PROGRAM

CROSS REFERENCE TO RELATED APPLICATIONS

This application is based upon and claims the benefit of priority from Japanese patent application No. 2020-21784, filed on Feb. 12, 2020, the disclosure of which is incorporated herein in its entirety by reference.

BACKGROUND

The present disclosure relates to a task execution system, a radio connection method, and a program, and in particular, relates to control of radio connection of an autonomous mobile robot.

In recent years, development of autonomous mobile robots that autonomously move in a building or outdoors and convey objects has been advancing. These autonomous mobile robots may perform radio communication with other apparatuses for executing processing. In this case, the autonomous mobile robots perform radio communication with the other apparatuses via, for example, base stations.

Since the autonomous mobile robot moves, it is required to switch a base station to which the autonomous mobile robot is connected. With regard to this, for example, Japanese Unexamined Patent Application Publication No. 2008-90576 discloses a mobile robot that avoids a situation in which communication with a radio base station is interrupted while the mobile robot is moving. This mobile robot switches connections using a connection switch table indicating a radio base station to which the robot should be connected in association with the position of the mobile robot on a moving path.

SUMMARY

As described above, since the base stations are switched depending on the position of the mobile robot in the technique disclosed in Japanese Unexamined Patent Application Publication No. 2008-90576, when the mobile robot reaches a predetermined position, the base stations are switched. Therefore, it is possible that the base stations may be switched at an inappropriate timing when the mobile robot executes the task.

The present disclosure has been made in view of the aforementioned circumstances and aims to provide a task execution system, a radio connection method, and a program capable of switching a base station which is a connection destination at an appropriate timing.

An aspect of the present disclosure to accomplish the aforementioned object is a task execution system including an autonomous mobile robot configured to sequentially execute a plurality of tasks including movement, the autonomous mobile robot including: a radio communication unit configured to communicate with a base station; and a connection control unit configured to search for a base station with execution of a predetermined task as a trigger and switch a base station which is a connection destination of communication by the radio communication unit.

According to the above task execution system, the timing of switching the base station which is the connection destination depends on the timing when the predetermined task is executed. Therefore, it is possible to switch the base station when a task that is not affected by the switching of the base station is executed, and the base station which is a connection destination can be switched at an appropriate timing.

In the above aspect, the connection control unit may perform search and switch of the base station with execution of the predetermined task as a trigger when a received radio wave intensity of a signal from the base station in which communication is currently established is equal to or smaller than a predetermined threshold.

According to the above configuration, when the received radio wave intensity exceeds the predetermined threshold, it is possible to prevent the base stations from being switched. It is therefore possible to prevent unnecessary switching from occurring.

In the above aspect, the connection control unit may perform search and switch of the base station with the execution of the predetermined task as a trigger when an execution timing of the predetermined task executed by the autonomous mobile robot is before an execution timing of a task that involves communication by a predetermined period or more.

According to the above configuration, it is possible to prevent a situation in which switching of the base station is not completed before the task that involves communication is executed, and to prevent switching of the base station from interfering with the execution of the task. Therefore, the base station which is a connection destination can be switched at a more appropriate timing.

In the above aspect, the autonomous mobile robot may include: a mobile apparatus configured to move the autonomous mobile robot; a position estimation unit configured to estimate a self position, which is a position of the autonomous mobile robot itself on a map of a mobile environment; a path planning unit configured to plan a moving path to a destination based on the map and the self position; and a movement control unit configured to control movement of the autonomous mobile robot in accordance with the planned moving path, in which the predetermined task may be a task of moving the autonomous mobile robot by the mobile apparatus.

According to the above configuration, the base stations are switched when the autonomous mobile robot moves, whereby it is possible to prevent switching of the base station from interfering with the execution of the task.

In the above aspect, the predetermined task may be a task for waiting until the next task is ready to be executed.

According to the above configuration, the base stations are switched while the autonomous mobile robot is waiting, whereby it is possible to prevent switching of the base station from interfering with the execution of the task.

In the above aspect, the predetermined task may be a task in which the autonomous mobile robot waits for arrival of an elevator car.

According to the above configuration, the base stations are switched while the autonomous mobile robot is waiting for the elevator, whereby it is possible to prevent switching of the base station from interfering with the execution of the task.

In the above aspect, the predetermined task may be a task that can be executed without requiring radio communication.

According to the above configuration, the base stations are switched while the autonomous mobile robot is not communicating with other equipment, whereby it is possible to prevent switching of the base station from interfering with the execution of the task.

In the above aspect, a server configured to provide the plurality of tasks for the autonomous mobile robot may be further included.

According to the above task execution system, the server is able to control the task to be executed by the autonomous mobile robot.

In the above aspect, the server may associate information indicating a timing of searching for a base station with a task and provide the plurality of tasks associated with the information for the autonomous mobile robot.

According to the above configuration, the autonomous mobile robot is provided with information indicating a timing of searching for a base station from the server. Therefore, even when the autonomous mobile robot does not hold the definition information indicating which task corresponds to the aforementioned predetermined task in advance, the base station which is a connection destination can be switched at an appropriate timing.

Another aspect of the present disclosure in order to accomplish the aforementioned object is a radio connection method in a task execution system including an autonomous mobile robot configured to sequentially execute a plurality of tasks including movement, in which the autonomous mobile robot searches for a base station with execution of a predetermined task as a trigger, and the autonomous mobile robot switches a base station which is a connection destination of radio communication in accordance with the result of the search.

According to the above radio connection method, the timing of switching the base station which is the connection destination depends on the timing when the predetermined task is executed. Therefore, it is possible to switch the base station when a task that is not affected by switching of the base station is executed, whereby the base station which is the connection destination can be switched at an appropriate timing.

Another aspect of the present disclosure in order to accomplish the aforementioned object is a program for causing a computer of an autonomous mobile robot configured to sequentially execute a plurality of tasks including movement to execute the following steps of: searching for a base station with execution of a predetermined task as a trigger; and switching a base station which is a connection destination of radio communication in accordance with the result of the search.

According to the above program, the timing of switching the base station which is the connection destination depends on the timing when the predetermined task is executed. Therefore, it is possible to switch the base station when a task that is not affected by switching of the base station is executed, whereby the base station which is the connection destination can be switched at an appropriate timing.

According to the present disclosure, it is possible to provide a task execution system, a radio connection method, and a program capable of switching a base station which is a connection destination at an appropriate timing.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, an embodiment of the present disclosure will be described.

Figure 1:
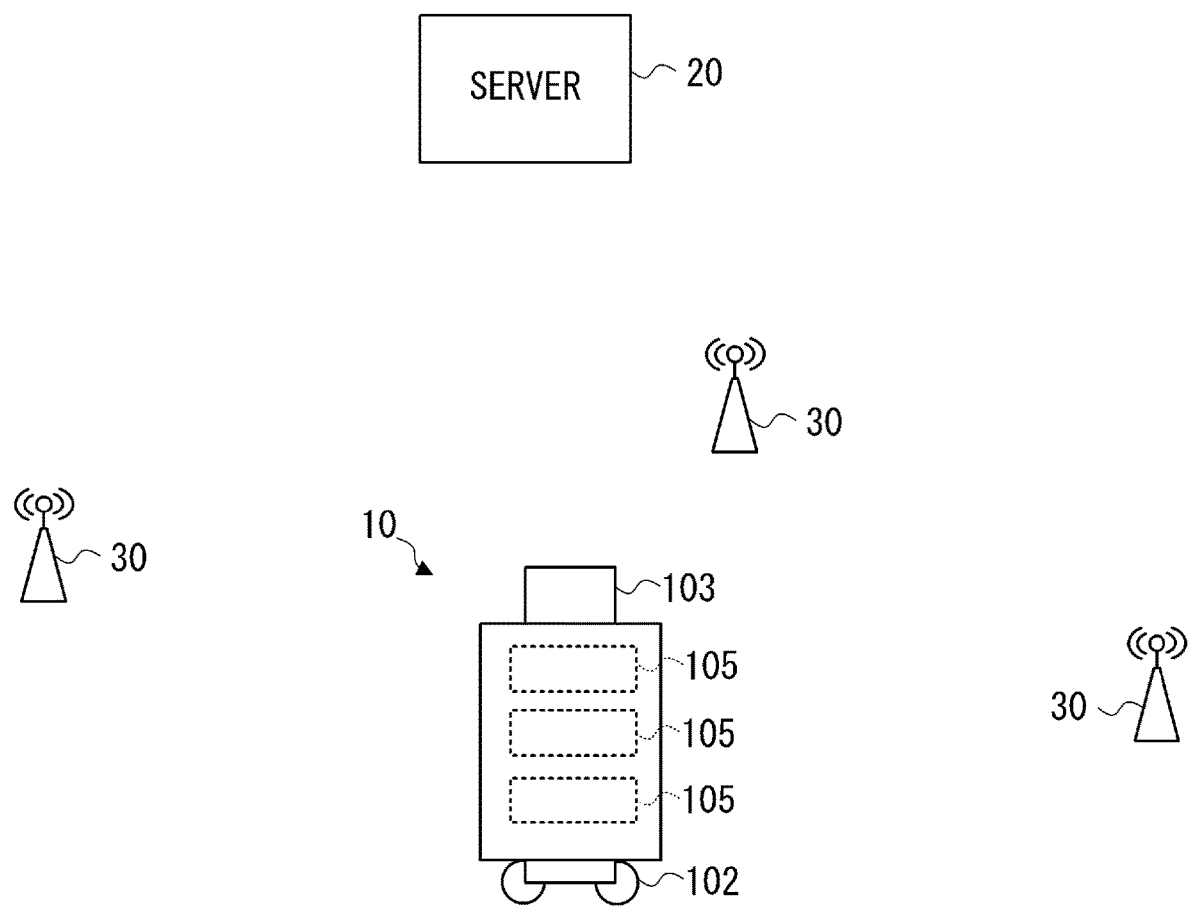
FIG. 1 is a schematic view showing one example of a system configuration of a task execution system according to an embodiment.

FIG. 1 is a schematic view showing one example of a system configuration of a task execution system 1 according to the embodiment. The task execution system 1 includes an autonomous mobile robot 10, a server 20, and base stations 30.

A plurality of base stations 30 are provided in a mobile environment of the autonomous mobile robot 10, and they perform radio communication with the autonomous mobile robot 10. In this embodiment, the base stations 30 are access points of a wireless Local Area Network (LAN) such as WiFi (registered trademark), as an example. Alternatively, the base stations 30 may be base stations of radio communication of other radio communication standards.

The autonomous mobile robot 10 is a robot that sequentially executes a plurality of tasks including movement. The tasks here are units of processing performed by the autonomous mobile robot 10 in order to accomplish a predetermined object. For example, the autonomous mobile robot 10 sequentially executes a task of moving from the current location to an elevator hall, a task of calling an elevator car, a task of waiting for the elevator car to come, a task of getting on the elevator car, a task of getting off the elevator car, a task of moving from the place where the autonomous mobile robot 10 has got off the elevator car to a point A etc. Accordingly, for example, the autonomous mobile robot 10 accomplishes the object of delivering an object entrusted to it by a user to the point A. Note that the aforementioned tasks are merely examples and the autonomous mobile robot 10 may execute other tasks.

Some of the various kinds of tasks executed by the autonomous mobile robot 10 require communication with another apparatus. For example, the autonomous mobile robot 10 communicates with the server 20 in order to call the elevator car. Specifically, the autonomous mobile robot 10 communicates with another apparatus via radio communication with the base station 30. In this embodiment, the autonomous mobile robot 10 communicates with the server 20 via the base station 30. Therefore, the autonomous mobile robot 10 is connected to one of the plurality of base stations 30 so that it can communicate with the server 20.

Note that the autonomous mobile robot 10 includes, for example, accommodation spaces 105 of objects. The autonomous mobile robot 10 conveys the objects accommodated in the accommodation spaces 105 by driving a mobile apparatus 102.

The server 20 is an apparatus for providing a task that the autonomous mobile robot 10 should execute for the autonomous mobile robot 10. Further, the server 20 controls equipment that is present in the mobile environment of the autonomous mobile robot 10. More specifically, the server 20 controls the equipment that the autonomous mobile robot 10 uses when executing the task. The server 20 controls, for example, an elevator, an automatic door and the like that are present in the mobile environment.

The server 20 is connected to the base station 30 so that they can communicate with each other by a wire or wirelessly. Further, the server 20 is connected to equipment such as an elevator that is present in the mobile environment so that they can communicate with each other by a wire or wirelessly.

While the autonomous mobile robot 10 executes the task provided by the server 20 in this embodiment, the autonomous mobile robot 10 may not necessarily receive a task from the server 20. That is, the autonomous mobile robot 10 may determine the task that it should execute from among predetermined tasks.

Next, details of the autonomous mobile robot 10 will be described.

Figure 2:
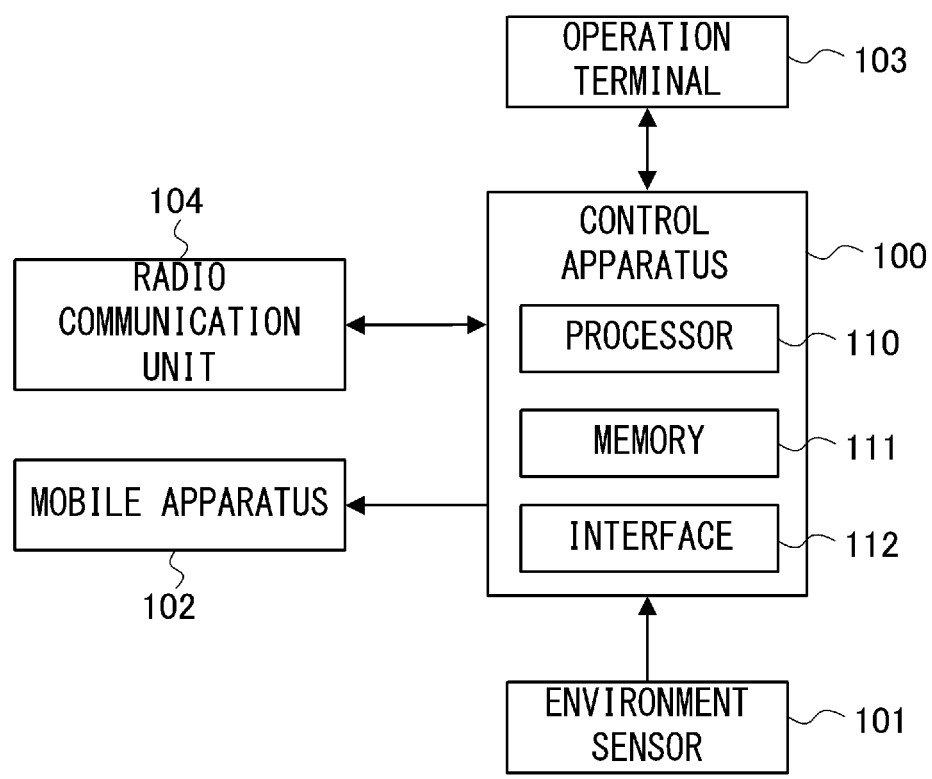
FIG. 2 is a block diagram showing one example of a hardware configuration of an autonomous mobile robot according to the embodiment.

FIG. 2 is a block diagram showing one example of a hardware configuration of the autonomous mobile robot 10. As shown in FIG. 2, the autonomous mobile robot 10 includes a control apparatus 100, an environment sensor 101, a mobile apparatus 102, an operation terminal 103, and a radio communication unit 104.

The control apparatus 100, which is an apparatus for controlling the autonomous mobile robot 10, includes a processor 110, a memory 111, and an interface 112. The processor 110, the memory 111, and the interface 112 are connected to one another via a data bus or the like.

The interface 112 is an input/output circuit that is used to communicate with another apparatus such as the environment sensor 101, the mobile apparatus 102, the operation terminal 103, or the radio communication unit 104.

The memory 111 is composed of, for example, a combination of a volatile memory and a non-volatile memory. The memory 111 is used to store software (computer program) including one or more instructions executed by the processor 110, data used for various kinds of processing of the autonomous mobile robot 10 and the like.

The processor 110 loads software (computer program) from the memory 111 and executes the loaded software (computer program), thereby performing processing of the respective components shown in FIG. 3 that will be described later. Specifically, the processor 110 performs processing of a task execution unit 120, a position estimation unit 130, a path planning unit 140, a movement control unit 150, and a connection control unit 160.

The processor 110 may be, for example, a microprocessor, a Micro Processor Unit (MPU), a Central Processing Unit (CPU) or the like. The processor 110 may include a plurality of processors.

In this way, the control apparatus 100 is an apparatus that functions as a computer.

The environment sensor 101 is a sensor that detects environment information in the vicinity of the autonomous mobile robot 10 (e.g., distance information, image information etc. regarding an object in the vicinity of the autonomous mobile robot 10). The environment sensor 101 may be, for example, a distance sensor such as a camera (an RGB-D camera, a stereo camera), a laser range finder, an ultrasonic sensor or the like. The environment sensor 101 detects environment information that is required for the autonomous mobile robot 10 to move. The environment sensor 101 outputs the detected environment information to the control apparatus 100.

The mobile apparatus 102 is an apparatus that rotates a plurality of wheels by driving, for example, a motor or the like in accordance with a control signal from the control apparatus 100, thereby moving the autonomous mobile robot 10 to a desired position. The mobile apparatus 102 may not be an apparatus that moves in a wheel-type manner and may be an apparatus that moves, for example, in a walking manner.

The operation terminal 103, which is a terminal that accepts operation input from the user and outputs information, is, for example, a terminal that includes a touch panel. The operation terminal 103 may be achieved by another input/output apparatus in place of the touch panel.

The radio communication unit 104, which is a circuit that is connected to the base station 30 wirelessly in order to communicate with another apparatus such as the server 20, includes, for example, a radio transmission/reception circuit and an antenna. The radio communication unit 104 establishes radio connection with the base station selected by control by the connection control unit 160 that will be described later, and communicates with this selected base station.

Figure 3:
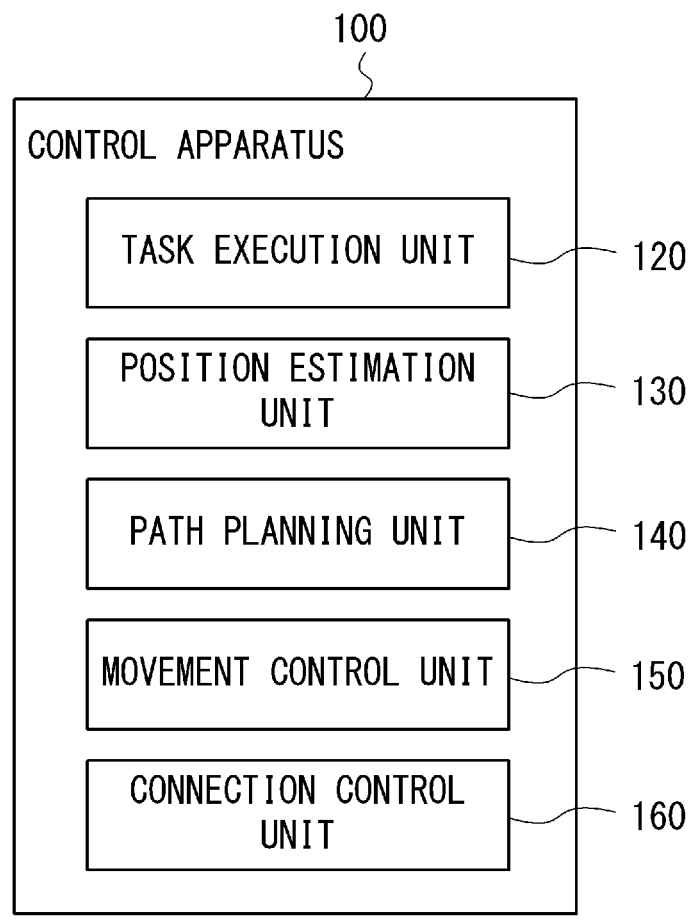
FIG. 3 is a block diagram showing one example of a functional configuration of a control apparatus of the autonomous mobile robot according to the embodiment.

FIG. 3 is a block diagram showing one example of a functional configuration of the control apparatus 100 of the autonomous mobile robot 10. As shown in FIG. 3, the autonomous mobile robot 10 includes the task execution unit 120, the position estimation unit 130, the path planning unit 140, the movement control unit 150, and the connection control unit 160.

The task execution unit 120 sequentially executes a plurality of tasks in order to accomplish a predetermined object. The task execution unit 120 sequentially executes, for example, a series of tasks provided by the server 20.

When, for example, the task execution unit 120 receives an instruction from the user for conveying an object to the point A via the operation terminal 103, the task execution unit 120 executes a series of tasks for conveying the object from the current location to the point A in series. This task group is provided by the server 20 in this embodiment. That is, upon receiving an instruction from the user for conveying an object to the point A, the task execution unit 120 transmits the content of this instruction to the server 20. On the other hand, the server 20 transmits a series of tasks for conveying the object from the current location to the point A to the autonomous mobile robot 10. On the other hand, the task execution unit 120 executes the tasks received from the server 20 in series. For example, the task execution unit 120 sequentially executes a task of moving from the current location to an elevator hall, a task of calling an elevator car, a task of waiting for the elevator car to come, a task of getting on the elevator car, a task of getting off the elevator car, a task of moving from the place where it has got off the elevator car to the point A.

As described above, the task execution unit 120 may either execute a task that involves radio communication or execute a task that can be executed without requiring radio communication. In the aforementioned examples, a task of moving from the current location to the elevator hall, a task of waiting for the elevator car to come, a task of getting on the elevator car, a task of getting off the elevator car, a task of moving from the place where it has got off the elevator car to the point A are tasks that can be executed without requiring radio communication. On the other hand, the task of calling the elevator car is a task that involves radio communication since this task requires communication with the server 20 in order to call the car.

Note that specific examples of the tasks executed by the task execution unit 120 are not limited to the aforementioned ones. The task execution unit 120 may execute, for example, a task of waiting at a predetermined place since this autonomous mobile robot 10 passes another autonomous mobile robot 10 or the like on a passage, a task of reporting the state of progress of the task to the server 20 by notifying the server 20 of the completion of the execution of the task, or a task of going through an automatic door. In this way, the task execution unit 120 is able to execute desired tasks. As will be described later, some of the tasks that the task execution unit 120 may execute are used as a trigger for switching control of the base station 30.

In particular, the task execution unit 120 uses the position estimation unit 130, the path planning unit 140, and the movement control unit 150 when executing the task of moving by the mobile apparatus 102. Since the autonomous mobile robot 10 is able to autonomously move by the mobile apparatus 102 by the processing of the position estimation unit 130, the path planning unit 140, and the movement control unit 150, the autonomous mobile robot 10 is able to execute a task of moving by the mobile apparatus 102 even when the autonomous mobile robot 10 does not perform communication with another apparatus. That is, in this embodiment, the task of moving the autonomous mobile robot 10 by the mobile apparatus 102 is a task that can be executed without requiring radio communication.

The position estimation unit 130 refers to data of a map of the mobile environment stored in the memory 111 or the like in advance and estimates the self position, which is the position of the autonomous mobile robot 10 itself on the map position of the mobile environment. That is, the position estimation unit 130 estimates which position on the map the autonomous mobile robot 10 is currently located. The position estimation unit 130 estimates the self position of the autonomous mobile robot 10 using a desired known method. The position estimation unit 130 may estimate the self position of the autonomous mobile robot 10 by comparing the environment information detected by the environment sensor 101 with the map of the mobile environment, estimate the self position by dead reckoning using odometry information, estimate the self position using a Global Navigation Satellite System (GNSS), or estimate the self position by combining any one of them.

The path planning unit 140 plans a moving path to the destination based on the map of the mobile environment and the self position estimated by the position estimation unit 130. The path planning unit 140 plans a moving path of the autonomous mobile robot 10 which bypasses an obstacle or the like based on the map of the mobile environment and the self position using, for example, a known path searching algorithm. Therefore, the path planning unit 140 plans, for example, a moving path from the current location to the elevator hall or a moving path from the point where it has got off the elevator car to the point A.

The movement control unit 150 controls the movement of the autonomous mobile robot 10 in accordance with the moving path planned by the path planning unit 140. That is, the movement control unit 150 controls the mobile apparatus 102 so that the autonomous mobile robot 10 moves in accordance with the planned moving path. More specifically, the movement control unit 150 transmits a control signal to the mobile apparatus 102, thereby controlling the moving direction and the moving speed of the autonomous mobile robot 10.

The connection control unit 160 searches for the base station 30 with execution of a predetermined task as a trigger and switches the base station 30 which is the connection destination of the communication by the radio communication unit 104. Specifically, for example, the connection control unit 160 may search for the base station 30 upon receiving a Wi-Fi beacon signal from the base station 30 (that is, it may perform passive scanning) or may search for the base station 30 upon receiving a response to a probe request that it has issued (that is, it may perform active scanning).

The connection control unit 160 switches the base station 30 by selecting the base station 30 which is the connection destination based on the received radio wave intensity regarding the signal from the searched base station 30. The connection control unit 160 selects, for example, a base station 30 whose received radio wave intensity is a maximum as the base station 30 which is the connection destination.

Incidentally, when the base stations 30 are switched, the connection control unit 160 interrupts the connection with the base station 30 to which the autonomous mobile robot 10 is currently connected and establishes connection with a new base station 30. Therefore, interruption of communication temporarily occurs. Therefore, it is possible that it may be difficult to execute the task depending on the timing when the base stations 30 are switched.

However, according to this embodiment, as described above, the connection control unit 160 searches and switches the base station 30 with execution of a predetermined task as a trigger. The predetermined task is a task that can be executed even when communication is temporarily interrupted. Which task corresponds to the aforementioned predetermined task is predetermined. In this way, according to this embodiment, the timing when the base station 30 which is the connection destination is switched depends on the task to be executed. Therefore, it becomes possible to execute switching when a task that is not affected by the switching of the base station 30 is executed, whereby it is possible to switch the base station 30 which is the connection destination at an appropriate timing.

The predetermined tasks may include, for example, the task of moving the autonomous mobile robot 10 by the mobile apparatus 102. That is, the connection control unit 160 may execute search and switch of the base station 30 when the execution of the task of moving the autonomous mobile robot 10 by the mobile apparatus 102 is started or while the task is being executed. As described above, in this embodiment, the autonomous mobile robot 10 is able to perform autonomous movement by the mobile apparatus 102 even when it does not communicate with another apparatus. Therefore, even when interruption of communication associated with the switching of the base station 30 occurs while a task of moving by the mobile apparatus 102 is being executed, it does not affect execution of the task. Therefore, in this case, it is possible to switch the base station 30 which is the connection destination at an appropriate timing.

Further, the predetermined task may be a task of waiting until the next task is ready to be executed. For example, the predetermined task may be a task in which the autonomous mobile robot 10 waits for the elevator car to come. That is, the connection control unit 160 may execute search and switch of the base station 30 when the waiting task is started or while this task is being executed. While the waiting task is being executed, no problem occurs even when interruption of communication associated with the switching of the base station 30 occurs. Therefore, in this case, it is possible to switch the base station 30 which is the connection destination at an appropriate timing.

It is sufficient that the predetermined task be a task that can be executed even when communication is temporarily interrupted. However, it is more preferable that the predetermined task be a task that can be executed without requiring radio communication. This is because, since the switching of the base station 30 is performed while the autonomous mobile robot 10 is not communicating with other equipment according to the latter configuration, the base station 30 can be switched without affecting the execution of the task.

Next, details of the server 20 will be described.

Figure 4:
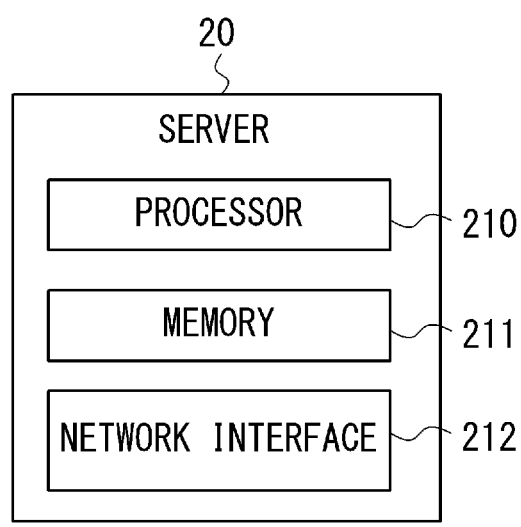
FIG. 4 is a block diagram showing one example of a hardware configuration of a server according to the embodiment.

FIG. 4 is a block diagram showing one example of a hardware configuration of the server 20. As shown in FIG. 4, the server 20 includes a network interface 212, a memory 211, and a processor 210. The network interface 212, the memory 211, and the processor 210 are connected to one another via a data bus or the like.

The network interface 212 is used to communicate with another desired apparatus. For example, the network interface 212 may be used to communicate with other equipment such as an elevator or an automatic door that is present in the mobile environment. Further, the network interface 212 may be used for the communication with the autonomous mobile robot 10 via the base station 30. The network interface 212 may include, for example, a network interface card (NIC).

The memory 211 is composed of, for example, a combination of a volatile memory with a non-volatile memory. The memory 211 is used to store software (computer program) including one or more instructions executed by the processor 210, and data used for various kinds of processing of the server 20 etc.

The processor 210 loads software (computer program) from the memory 211 and executes the loaded software (computer program), thereby performing processing of a task management unit 220 and an environment control unit 230 shown in FIG. 5 that will be described later.

The processor 210 may be, for example, a microprocessor, an MPU, or a CPU. The processor 210 may include a plurality of processors.

As described above, the server 20 includes a function as a computer.

Note that the aforementioned program executed by the autonomous mobile robot 10 or the server 20 can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 5:
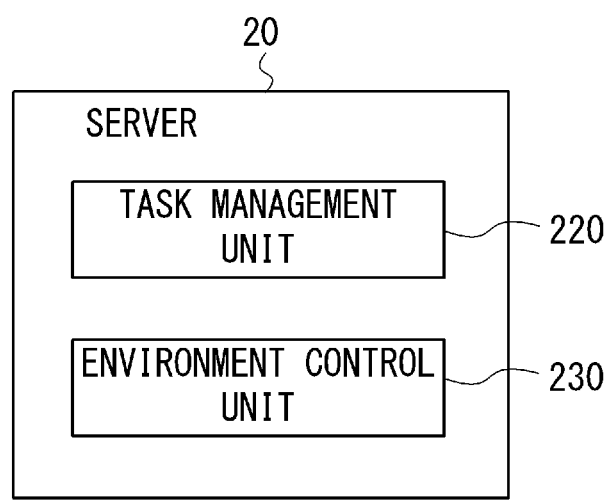
FIG. 5 is a block diagram showing one example of a functional configuration of a server according to the embodiment.

FIG. 5 is a block diagram showing one example of a functional configuration of the server 20. As shown in FIG. 5, the server 20 includes the task management unit 220 and the environment control unit 230.

The task management unit 220 provides a task that the autonomous mobile robot 10 should execute for the autonomous mobile robot 10. That is, the task management unit 220 performs processing of transmitting a series of tasks for accomplishing the predetermined object to the autonomous mobile robot 10. The task management unit 220 further manages the state of progress of the task reported from the autonomous mobile robot 10.

Note that the task management unit 220 may associate information indicating the timing when the base station 30 is searched with a task and provide the task associated with the information for the autonomous mobile robot 10. According to this configuration, it becomes possible to switch the base station 30 which is the connection destination at an appropriate timing even when the autonomous mobile robot 10 does not hold definition information indicating which task corresponds to a predetermined task in advance. When the autonomous mobile robot 10 holds this definition information in advance, the task management unit 220 may not associate information indicating the timing when the base station 30 is searched with a task and provide the information for the autonomous mobile robot 10.

The environment control unit 230 controls the equipment that the autonomous mobile robot 10 uses when it executes the task. Specifically, the environment control unit 230 controls equipment that is present in the mobile environment in accordance with the state of progress of the task of the autonomous mobile robot 10. That is, upon receiving the report of the progress notifying, for example, that the autonomous mobile robot 10 has arrived at the elevator hall from the autonomous mobile robot 10, the environment control unit 230 controls the equipment. For example, when the autonomous mobile robot 10 arrives at the elevator hall, the environment control unit 230 performs control so that the elevator car moves to the floor where the autonomous mobile robot 10 is waiting. After the autonomous mobile robot 10 gets on the car, the environment control unit 230 performs control so that the car moves to the floor to which the autonomous mobile robot 10 should head. The environment control unit 230 communicates with equipment that is present in the mobile environment, thereby achieving these controls.

Next, a flow of the operation of switching the base station 30 performed by the autonomous mobile robot 10 will be described.

Figure 6:
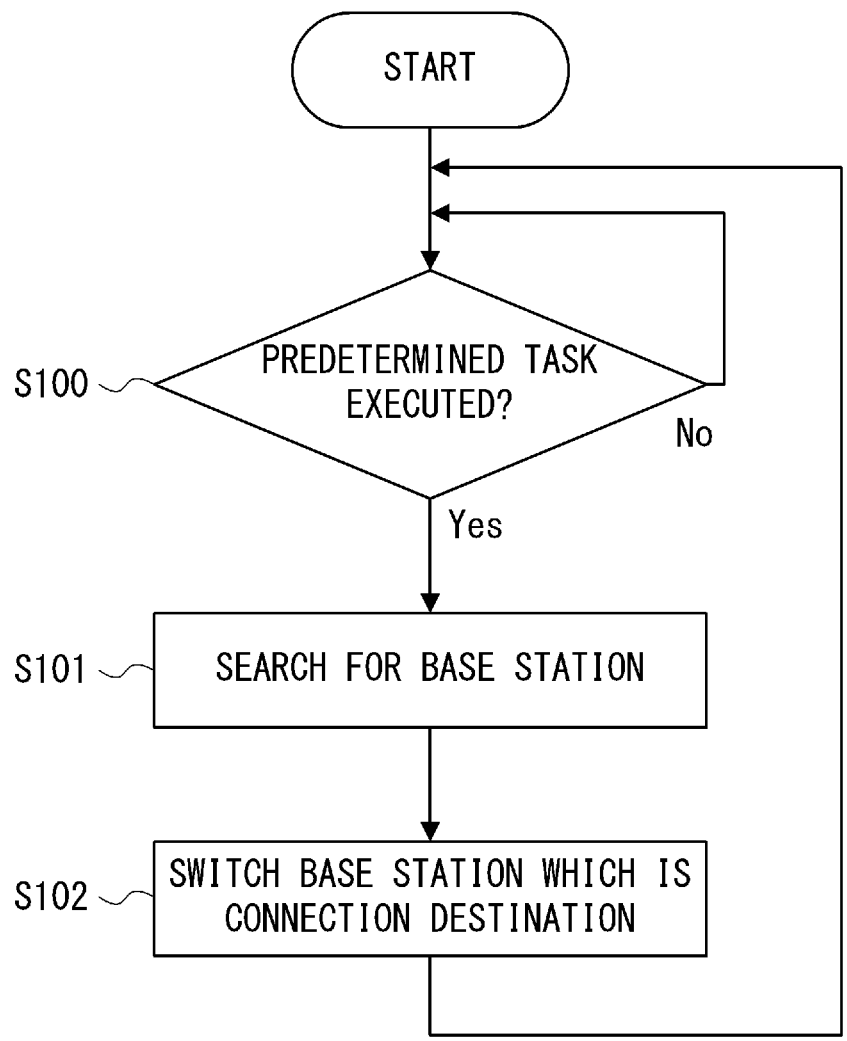
FIG. 6 is a flowchart showing one example of a radio connection method performed by the autonomous mobile robot according to the embodiment.

FIG. 6, which is a flowchart showing an example of the radio connection method performed by the autonomous mobile robot 10, shows a flow of the operation of switching the base station 30. Hereinafter, with reference to FIG. 6, the operation of switching the base station 30 will be described.

In Step S100, the connection control unit 160 determines whether or not the task to be executed by the autonomous mobile robot 10 is a predetermined task. When the predetermined task is executed, the processing proceeds to Step S101. Otherwise the processing of this step is repeated.

In Step S101, the connection control unit 160 searches for the base station 30. That is, the connection control unit 160 searches for the base station 30 with execution of a predetermined task as a trigger.

Next, in Step S102, the connection control unit 160 switches the base station 30 which is the connection destination of the radio communication in accordance with the result of the search.

As described above, by performing the aforementioned switching, it is possible to switch the base station 30 which is the connection destination at an appropriate timing.

Figure 7:
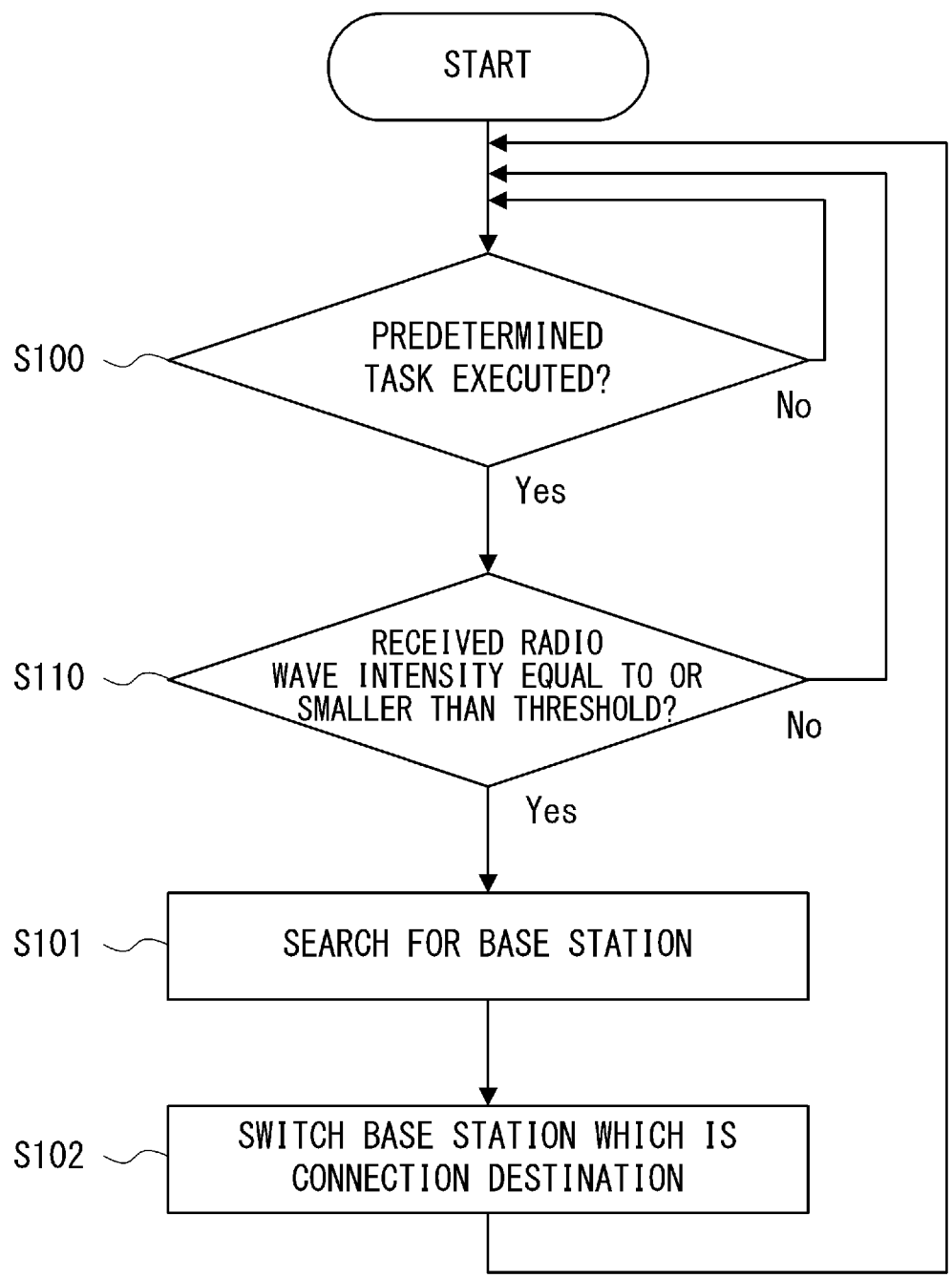
FIG. 7 is a flowchart showing one example of the radio connection method performed by the autonomous mobile robot according to the embodiment.

Note that the connection control unit 160 may search and switch the base station with execution of a predetermined task as a trigger when the received radio wave intensity of the signal from the base station 30 in which communication is currently established is equal to or smaller than a predetermined threshold. That is, as shown in FIG. 7, for example, the operation of switching the base station 30 may be performed. The flowchart shown in FIG. 7 may be different from the flowchart shown in FIG. 6 in that Step S110 is performed between Step S100 and Step S101.

Regarding the flowchart shown in FIG. 7, points that are different from those in FIG. 6 will be described. In the flowchart shown in FIG. 7, when the predetermined task is executed, the processing proceeds to Step S110. In Step S110, the connection control unit 160 determines whether or not the received radio wave intensity of the signal from the base station 30 in which communication is currently established is equal to or smaller than the predetermined threshold. When the received radio wave intensity is equal to or smaller than the threshold, the process moves to Step S101. When the received radio wave intensity is not equal to or smaller than the threshold, the process returns to Step S100.

By switching the base station as described above, it is possible to prevent the base station from being switched when the received radio wave intensity exceeds the predetermined threshold. That is, it is possible to prevent the switching of the base station 30 from occurring when the autonomous mobile robot 10 is present in a sufficiently good communication environment. It is therefore possible to prevent occurrence of unnecessary switching and to prevent interruption of communication associated with the switching.

Figure 8:
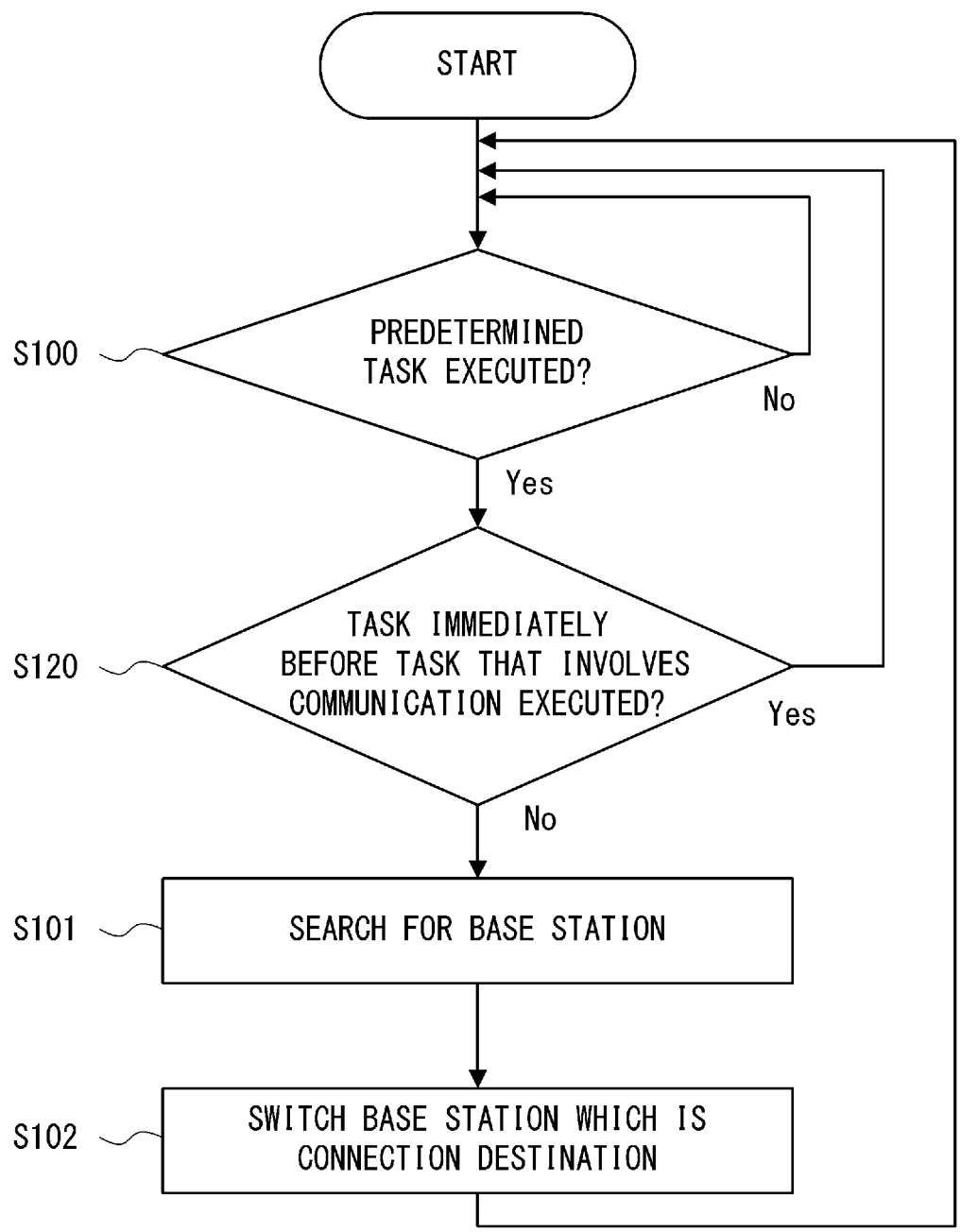
FIG. 8 is a flowchart showing one example of the radio connection method performed by the autonomous mobile robot according to the embodiment.

Further, the connection control unit 160 may perform search and switch of the base station with execution of a predetermined task as a trigger when an execution timing of the predetermined task executed by the autonomous mobile robot 10 is before an execution timing of a task that involves communication by a predetermined period or more. That is, as shown in FIG. 8, for example, the operation of switching the base station 30 may be performed. The flowchart shown in FIG. 8 is different from the flowchart shown in FIG. 6 in that Step S120 is performed between Step S100 and Step S101.

Regarding the flowchart shown in FIG. 8, the points that are different from those in FIG. 6 will be described. In the flowchart shown in FIG. 8, when the predetermined task is executed, the process proceeds to Step S120. In Step S120, the connection control unit 160 determines whether or not the timing when the task regarding which the determination is made in Step S110 is executed is before the timing when a subsequent task that involves communication is executed by a predetermined period or more. In other words, the connection control unit 160 determines whether or not the task to be executed by the autonomous mobile robot 10 is a task immediately before the task that involves communication. That is, it can be also said that the connection control unit 160 determines whether or not the subsequent task is a task that involves communication. When the task to be executed by the autonomous mobile robot 10 is a task immediately before the task that involves communication, the process returns to Step S100. Otherwise the process proceeds to Step S101.

By performing the switching of the base station as described above, it is possible to prevent a situation in which switching of the base station is not completed before the task that involves communication is executed and to prevent switching of the base station from interfering with the task execution. Therefore, the base station which is the connection destination can be switched at a more appropriate timing.

It is needless to say that the operation of switching the base station 30 may be performed by combining Step S110 shown in FIG. 7 with Step S120 shown in FIG. 8.

The present disclosure is not limited to the aforementioned embodiment and may be changed as appropriate without departing from the spirit of the present disclosure. For example, while the processing of the position estimation unit 130, the path planning unit 140, and the movement control unit 150 have been executed in the autonomous mobile robot 10 in the aforementioned embodiment, some or all of these processing may be executed by the server 20 or another apparatus. In this case, the task of moving the autonomous mobile robot 10 by the mobile apparatus 102 may be excluded from the predetermined tasks.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A task execution system comprising an autonomous mobile robot configured to sequentially execute a plurality of tasks including movement, the autonomous mobile robot comprising:
    a radio communication unit configured to communicate with a first base station and a second base station; and
    a connection control unit configured to search for the second base station upon execution of a predetermined task of the plurality of tasks, and to switch the communication of the radio communication unit from the first base station to the second base station during the predetermined task, the predetermined task being a task that can be executed without requiring radio communication,
    wherein the predetermined task is a task in which the autonomous mobile robot waits for arrival of an elevator car.

2. The task execution system according to claim 1, wherein the connection control unit performs the switch of the first base station to the second base station when a received radio wave intensity of a signal from the first base station in which communication is currently established is equal to or smaller than a predetermined threshold.

3. The task execution system according to claim 1, wherein the connection control unit performs the switch of the first base station to the second base when an execution timing of the predetermined task is before an execution timing of a task that involves communication by a predetermined period or more.

4. The task execution system according to claim 1, wherein the autonomous mobile robot comprises:
    a mobile apparatus configured to move the autonomous mobile robot;

a position estimation unit configured to estimate a self position, which is a position of the autonomous mobile robot itself on a map of a mobile environment;

a path planning unit configured to plan a moving path to a destination based on the map and the self position; and a movement control unit configured to control movement of the autonomous mobile robot in accordance with the planned moving path.

5. The task execution system according to claim 1, further comprising a server configured to provide the plurality of tasks for the autonomous mobile robot.

6. The task execution system according to claim 5, wherein the server associates information indicating a timing of searching for a base station with a task and provides the plurality of tasks associated with the information for the autonomous mobile robot.

7. A radio connection method in a task execution system comprising an autonomous mobile robot configured to communicate with a first base station and a second base station and to sequentially execute a plurality of tasks including movement, the method comprising:

searching for the second base station upon execution of a predetermined task of the plurality of tasks, and switching from the first base station to the second base station during the predetermined task of the plurality of tasks, the predetermined task being a task that can be executed without requiring radio communication, wherein the predetermined task is a task in which the autonomous mobile robot waits for arrival of an elevator car.

8. A non-transitory computer readable medium storing a program for causing a computer of an autonomous mobile robot configured to communicate with a first base station and a second base station and to sequentially execute a plurality of tasks including movement to execute the following steps of:

searching for the second base station upon execution of a predetermined task of the plurality of tasks, and switching from the first base station to the second base station during the predetermined task of the plurality of tasks, the predetermined task being a task that can be executed without requiring radio communication, wherein the predetermined task is a task in which the autonomous mobile robot waits for arrival of an elevator car.

* * * * *